(12) United States Patent
Quaedackers

(10) Patent No.: US 10,636,157 B2
(45) Date of Patent: Apr. 28, 2020

(54) METHOD AND SYSTEM FOR CALCULATING A HEIGHT MAP OF A SURFACE OF AN OBJECT FROM AN IMAGE STACK IN SCANNING OPTICAL 2.5D PROFILING OF THE SURFACE BY AN OPTICAL SYSTEM

(71) Applicant: MITUTOYO CORPORATION, Kanagawa (JP)

(72) Inventor: Johannes Anna Quaedackers, Veldhoven (NL)

(73) Assignee: MITUTOYO CORPORATION, Kanagawa (JP)

( * ) Notice: Subject to any disclaimer, the term of this patent is extended or adjusted under 35 U.S.C. 154(b) by 62 days.

(21) Appl. No.: 15/946,146

(22) Filed: Apr. 5, 2018

(65) Prior Publication Data
US 2018/0315207 A1 Nov. 1, 2018

(30) Foreign Application Priority Data
Apr. 26, 2017 (EP) ..................................... 17168243

(51) Int. Cl.
*G01B 21/16* (2006.01)
*G06T 7/571* (2017.01)
(Continued)

(52) U.S. Cl.
CPC ............ *G06T 7/571* (2017.01); *G01B 9/0209* (2013.01); *G01B 9/02071* (2013.01);
(Continued)

(58) Field of Classification Search
CPC .......... G06T 7/571; G06T 7/70; G06T 5/002; G06T 5/50; G06T 7/521;
(Continued)

(56) References Cited

U.S. PATENT DOCUMENTS

| 5,756,981 A * | 5/1998 | Roustaei | ................. G03F 7/705 |
| | | | 235/462.07 |
| 6,853,452 B1 * | 2/2005 | Laufer | ............... G01N 21/3504 |
| | | | 356/436 |

(Continued)

OTHER PUBLICATIONS

Office Action issued in European Office Counterpart Patent Appl. No. 17168243.8, dated Sep. 1, 2017.

*Primary Examiner* — Philip P. Dang
(74) *Attorney, Agent, or Firm* — Greenblum & Bernstein, P.L.C.

(57) ABSTRACT

Method and system for calculating a height map of a surface of an object from an image stack in scanning optical 2.5D profiling of the surface by an optical system, a focal plane is scanned at different height positions with respect to the object surface. An image is captured at each height position of the focal plane to form the image stack. The scanning of the focal plane comprises long range sensing and short range sensing a displacement of the focal plane for sensing low and high spatial frequency components. The height position of the focal plane is estimated by combining the low and high spatial frequency components. A height position of each image in the image stack is calculated, based on the estimated height position of each respective focal plane. The images of the image stack are interpolated to equidistant height positions for obtaining a corrected image stack.

19 Claims, 3 Drawing Sheets

(51) Int. Cl.
*G06T 5/00* (2006.01)
*G06T 7/70* (2017.01)
*G06T 7/521* (2017.01)
*H04N 5/232* (2006.01)
*G06T 5/50* (2006.01)
*G01B 21/04* (2006.01)
*G01B 9/02* (2006.01)
*G02B 21/00* (2006.01)

(52) U.S. Cl.
CPC ....... *G01B 9/02076* (2013.01); *G01B 21/045* (2013.01); *G06T 5/002* (2013.01); *G06T 5/50* (2013.01); *G06T 7/521* (2017.01); *G06T 7/70* (2017.01); *H04N 5/23267* (2013.01); *G02B 21/002* (2013.01); *G06T 2207/10028* (2013.01); *G06T 2207/10148* (2013.01)

(58) Field of Classification Search
CPC ........... G06T 2207/10148; G06T 2207/10028; G01B 9/02076; G01B 9/0209; G01B 9/02071; G01B 21/045; G02B 21/002; H04N 5/23267
See application file for complete search history.

(56) References Cited

U.S. PATENT DOCUMENTS

| | | | | |
|---|---|---|---|---|
| 7,504,988 B2 * | 3/2009 | Tsuchihashi | ............ | G01S 13/34 342/158 |
| 8,274,405 B2 * | 9/2012 | Bos | ...................... | G07B 15/063 340/10.1 |
| 8,338,570 B2 * | 12/2012 | Saeidi | ...................... | C08H 1/06 530/356 |
| 8,537,444 B2 * | 9/2013 | Gil | ...................... | G03F 7/70466 359/9 |
| 8,547,557 B2 * | 10/2013 | Jansen | ................ | G02B 27/283 356/495 |
| 8,718,837 B2 * | 5/2014 | Wang | ................... | B25J 9/1689 701/2 |
| 10,203,762 B2 * | 2/2019 | Bradski | ................ | G02B 27/225 |
| 10,210,295 B2 * | 2/2019 | Rosenbluth | ............... | G03F 1/36 |
| 2002/0196450 A1 | 12/2002 | Olszak et al. | | |
| 2005/0083531 A1 | 4/2005 | Millerd et al. | | |
| 2005/0237535 A1 | 10/2005 | Deck | | |
| 2006/0215173 A1 | 9/2006 | Hill et al. | | |
| 2008/0059015 A1 * | 3/2008 | Whittaker | ............ | G05D 1/0274 701/23 |
| 2013/0155413 A1 | 6/2013 | Liesener et al. | | |
| 2017/0006227 A1 * | 1/2017 | O'Neill | ............. | H04N 5/23254 |
| 2019/0162945 A1 * | 5/2019 | Hua | .................. | G02B 27/0075 |

* cited by examiner

METHOD AND SYSTEM FOR CALCULATING A HEIGHT MAP OF A SURFACE OF AN OBJECT FROM AN IMAGE STACK IN SCANNING OPTICAL 2.5D PROFILING OF THE SURFACE BY AN OPTICAL SYSTEM

CROSS-REFERENCE TO RELATED APPLICATIONS

The present application claims priority under 35 U.S.C. § 119 of European Application No. 17168243.8, filed on Apr. 26, 2017, the disclosure of which is expressly incorporated by reference herein in its entirety.

BACKGROUND OF THE INVENTION

1. Field of the Invention

The disclosure relates to a method and system in the field of scanning optical 2.5D profiling of a surface of an object by an optical system. The disclosure more specifically relates to a method and system for calculating a height map of a surface of an object from an image stack in such scanning optical profiling. The optical system is configured for scanning a focal plane at different height positions with respect to the surface of the object, capturing an image at each height position to form the image stack, and calculating a height map of the object surface from the image stack. Herein, scanning optical 2.5D profiling includes techniques like White Light Interferometry, WLI, Structured Illumination Microscopy, SIM, Point From Focus (synonym: Focus Variation) Microscopy, Confocal Microscopy, etc.

2. Description of Related Art

In optical scanning 2.5D profilometers, the optical sensor system is scanned with respect to a test sample. At each scanning position an image of the sample is recorded to generate a stack of images. These images are processed to calculate a height map.

In most algorithms used to calculate a height map from an image stack, a constant optical path length difference (step size) between all images is assumed, or at least the exact position at with each image was taken needs to be known.

In reality, either because of servo errors or internal and external vibration sources, there will be errors in the step sizes between the images. These step size errors will in turn cause errors in the resulting height maps.

Herein, WLI is discussed as an example to explain these errors. In interferometry, a light beam is divided into two beams, a measurement beam and a reference beam. When the two beams are recombined an interference pattern (fringes) as function of the path length difference between the measurement beam and the reference beam can be recorded. In case of perfectly coherent light with a narrow angular distribution the interference pattern will stretch indefinitely. In such a case, solving the path length difference from the interference pattern is ambiguous. By reducing the spectral coherence (using a broad band light spectrum, also referred to as white light), the length of the interference pattern (coherence length) will be reduced, and the path length difference between the measurement beam and the reference beam can be determined from the fringe pattern.

In the application of WLI for surface measurement of a sample, the focal plane is scanned vertically with respect to the sample surface. At each focus position an image is captured. The combined images form a 3D image stack. Each lateral position of this image stack defines an interferogram. From each interferogram, the local height position at the lateral position of the sample can be determined.

Most commercial WLI equipment is specified to measure height maps with a repeatability of only a few nanometer, nm.

The interference data analysis is done by using Fourier Transform, FT, methods. In the standard FT methods, a Fourier Transform or Fast Fourier Transform of the recorded interference signal is calculated. As an example, first a FT of the recorded interference signal may be calculated. Next, all frequency contributions except for the positive spatial frequencies corresponding to the illumination spectrum may be set to zero. By taking the inverse FT, the modulus of the obtained signal represents an envelope function of the original interference pattern, whereas the argument represents the phase of the central wavelength of the original interference pattern. The top of the envelope is found by determining a centre of mass. This top can be used as a first estimate of the local sample height. Next, the nearest phase-zero-crossing is found by linear interpolation of the unwrapped phase. The position corresponding with the phase-zero-crossing provides highly accurate sample heights.

Others have used variations of FT methods, and also other methods. These methods, however, all have nearly identical sensitivity for non-equidistant scan steps.

The standard FT methods assume perfectly equidistant scan steps. If the scan steps are not perfectly equidistant there will be errors in the resulting height map. Three kinds of errors related to non-equidistant scan steps can be distinguished:

1. If the non-equidistant errors are small, this will result in small offsets of both the envelope top and the phase-zero-crossing. This causes waviness in the measured height maps that corresponds to the height variation within the test sample.
2. If the non-equidistance in the steps is large, the phase-zero-crossing locating algorithm might snap to one of the neighbouring phase-zero-crossings. This type of error appears as discrete jumps in the height map with a magnitude of an integer number times half of the central wavelength.
3. The local average scan step size might vary over a total scan range. As the standard algorithm assumes a fixed scan step of, for example, precisely 50, 60, or 70 nm, this effect will cause scaling errors. As a result the height maps will either be compressed or stretched. This effect will result in a systematic error, for example when measuring step heights.

Thus, there remains a need for improvement of both the accuracy (step height measurements) and the repeatability of WLI measurements, in particular when errors in the recorded position of images of the image stack are caused by scan errors, vibrations or servo motor errors.

SUMMARY OF THE INVENTION

It would be desirable to provide an improved, or alternative method and apparatus to improve recorded positions of images of an object. It would also be desirable to improve the accuracy of height map measurements in scanning optical 2.5D profiling. It would also be desirable to improve the repeatability of height map measurements in scanning optical 2.5D profiling. It would also be desirable to improve the accuracy of height map measurements in case of scan errors, vibrations or servo motor errors.

To better address one or more of these concerns, in a first aspect of the disclosure a method for calculating a height map of a surface of an object from an image stack in scanning optical 2.5D profiling of the surface by an optical system is provided. The method includes:

scanning a focal plane at different height positions with respect to the object surface;

capturing an image at each height position of the focal plane to form the image stack, wherein the scanning of the focal plane includes:

long range sensing a displacement of the focal plane for sensing low spatial frequency components;

short range sensing a displacement of the focal plane for sensing high spatial frequency components; and estimating the height position of the focal plane by combining the low spatial frequency components and the high spatial frequency components;

calculating a height position of each image in the image stack, based on the estimated height position of each respective focal plane;

interpolating the images of the image stack to equidistant height positions for obtaining a corrected image stack; and calculating the height map of the surface of the object from the corrected image stack.

By using two different types of displacement sensing, on the one hand a long range sensing for sensing low spatial frequency components, and on the other hand a short range sensing for sensing high spatial frequency components of a displacement, the best estimate of a real distance between the object, in particular the surface of the object, and the optical system corresponding to each focal plane can be calculated. The long range sensing is especially accurate in recording low spatial frequency motion or displacement, whereas the short range sensing is especially accurate in recording high spatial frequency motion or displacement. By combining the low spatial frequency components and the high spatial frequency components, an extremely accurate estimate of the distance between the surface of the object and the focal plane of the optical system (i.e., the height position of the focal plane with respect to the surface of the object) can be obtained.

In this combining operation, filters may be used to select the most appropriate spatial frequencies provided by the long range sensing and the short range sensing. For example, the low spatial frequency components measured by the long range sensing may be filtered to remove high spatial frequency components. Alternatively or additionally, the high frequency components measured by the short range sensing may be filtered to remove low spatial frequency components. The filtering may include using a moving average filter, or a filter in the frequency domain using a Fourier transform, or any other appropriate digital function.

The interpolating step includes interpolating the image stack intensities to an equidistant distance between all focal planes using the estimate of the height position corresponding to each focal plane. The interpolation may include a linear interpolation, a spline interpolation, or a cubic interpolation.

In an embodiment of the method, the long range sensing includes optical, mechanical or capacitive encoding, in particular linear encoding.

The long range sensing may be performed using a long range type displacement sensor including an optical, mechanical, or capacitive encoder, in particular a linear encoder.

In an embodiment of the method, the short range sensing includes sensing vibrations.

The short range sensing may be performed using a short range type displacement sensor including at least one vibration sensitive sensor, in particular an accelerometer or a Laser Doppler Vibrometer, LDV. In an embodiment, the LDV includes a system on a chip or a photonic integrated device.

In an embodiment of the method, the short range sensing is performed from the optical system, in particular from an objective thereof. For this purpose, at least one short range type displacement sensor is mounted to the optical system, in particular to an objective of the optical system.

If it can be assumed that the object or object stage is less affected by vibrations than the optical system, then it may suffice to mount at least one short range type displacement sensor to the optical system, in particular the objective of the optical system. In some cases, this is a fair assumption because of a combination of the stiffness and mass inertia of a main frame and an object stage of an optical system and/or the use of active vibration damping. Then, the short range sensing includes sensing a displacement of the optical system with respect to the object, or with respect to an object stage supporting the object. For this purpose, the short range type displacement sensor is adapted to measure short range type of displacement of the optical system with respect to the object, or with respect to an object stage supporting the object.

In an embodiment of the method, the short range sensing further is performed from the object, or from an object stage supporting the object, and the short range sensing is based on a difference of a displacement sensed by the short range sensing performed from the optical system and a displacement sensed by the short range sensing from the object, or from the object stage supporting the object. Accordingly, in addition to a short range type displacement sensor mounted to the optical system, at least one further short range type displacement sensor is mounted to the object, or mounted to an object stage supporting the object, wherein the short range sensing is based on a difference of the displacement measured by the short range type displacement sensor mounted to the optical system, and the displacement measured by the further short range type displacement sensor mounted to the object, or mounted to the object stage supporting the object.

It may be beneficial to use additional short range type displacement sensors mounted to other parts of the system as well. For example, additional short range type displacement sensors may be added to a long range type displacement sensor or part thereof, to an optical sensor, or to other places that are sensitive to vibrations. Accordingly, in some embodiments, more than one short range displacement sensor may be mounted to the object stage. Using predetermined vibration mode models of the object stage combined with a plurality of short range displacement sensors, the precise vibrations of each location of the object stage and thus of the object may be predicted.

A benefit of using accelerometers as short range type displacement sensors is that the properties, such as reflectivity, angle and/or roughness, of the surface of the object is not relevant for the quality of the signal output by the accelerometers, in contrast to use of optical techniques wherein the surface properties of the object may be an issue adversely influencing signal quality.

Typically, the vertical resolution of an optical scanning profilometer is orders of magnitude better than the lateral resolution. Therefore, vibrations will mainly affect, referring to relative magnitude of errors with respect to lateral and vertical resolution, the vertical direction component of the resulting height maps. Therefore, in most cases an image stack correction in only Z direction suffices. However, albeit to a lesser extent, vibrations do affect the motion in the lateral direction, in particular in an environment with strong vibrations such as a shop floor with heavy machinery such as press drills, milling equipment, lathes, etc.

In most common implementations of 2.5D scanning optical profilers, only scanning in the vertical direction is performed. The correction in the lateral direction would not require a low spatial correction. For lateral corrections only short range type displacement sensor signals, such as produced by an accelerometer or an LDV, would be sufficient for a correction. Furthermore, practice has shown that even in a worst case, a lateral shift of images of the image stack (thus, of the object with respect to the optical axis) will be only one or at most two pixels in X or Y direction.

To correct for lateral shift, in an embodiment, the method further includes, before calculating a height map of the object surface from the image stack, the steps of sensing a lateral displacement error of each image of the image stack and, if a lateral displacement error of any one of the images is sensed, then laterally shifting or interpolating said any one of the images to correct the lateral displacement error.

In a second aspect of the present disclosure, a system for calculating a height map of a surface of an object from an image stack in scanning optical 2.5D profiling of the surface is provided. The system includes:

an optical system configured for:

scanning a focal plane at different height positions with respect to the object surface; and capturing an image at each height position of the focal plane to form the image stack;

a long range type displacement sensor for long range sensing a displacement of the focal plane by sensing low spatial frequency components;

a short range type displacement sensor for short range sensing a displacement of the focal plane by sensing high spatial frequency components, the short range type displacement sensor differing from the long range type displacement sensor; and a processing unit configured for:

estimating the height position of the focal plane by combining the low spatial frequency components from the long range type displacement sensor and the high spatial frequency components from the short range type displacement sensor;

calculating a height position of each image in the image stack, based on the estimated height position of each respective focal plane;

interpolating the images of the image stack to equidistant height positions for obtaining a corrected image stack; and calculating the height map of the surface of the object from the corrected image stack.

In an embodiment, the system includes at least one further short range type displacement sensor configured for sensing a lateral displacement error of each image of the image stack, wherein the processing unit further is configured for, if a lateral displacement error of any one of the images is sensed, laterally shifting or interpolating said any one of the images to correct for the lateral displacement error, before obtaining the corrected image stack. If an accelerometer based short range sensor is used, a 3D type of accelerometer integrated in one system, for example a MEMS, may be be used to measure high frequency displacements in X, Y and Z direction.

These and other aspects of the disclosure will be more readily appreciated as the same becomes better understood by reference to the following detailed description and considered in connection with the accompanying drawings in which like reference symbols designate like parts.

DETAILED DESCRIPTION OF EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
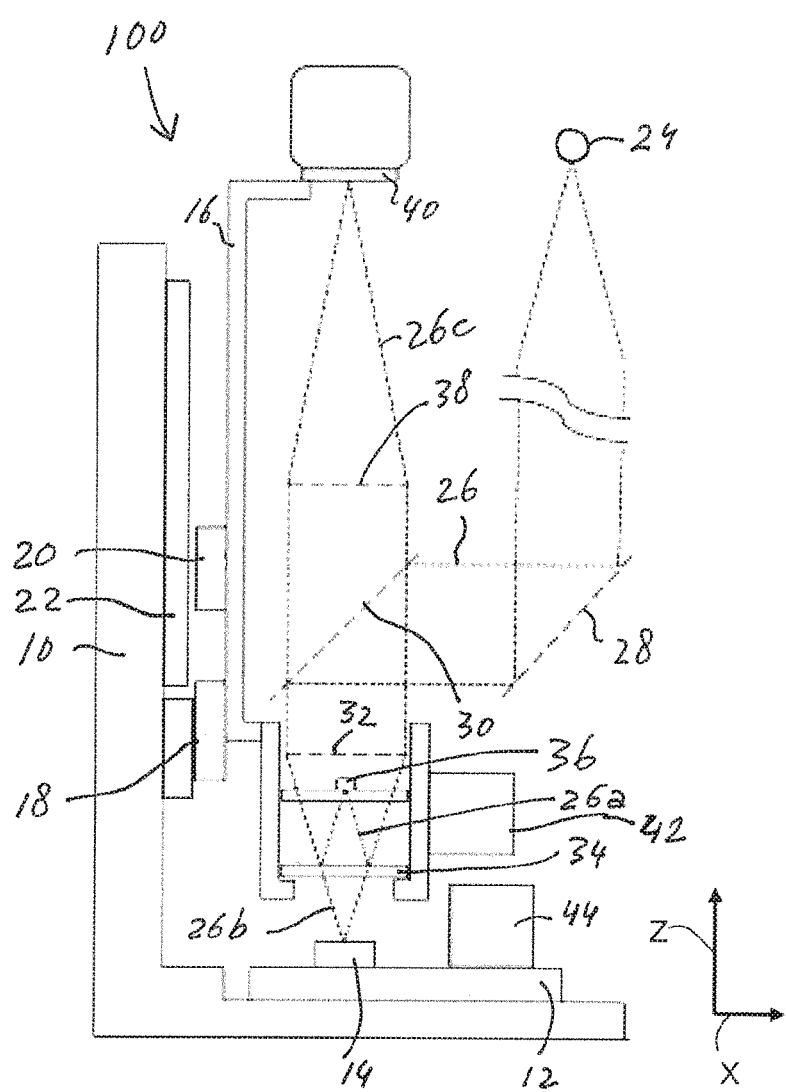
FIG. 1 schematically depicts an embodiment of a system for generating an image stack in scanning 2.5D profiling of a surface of an object in accordance with the present disclosure.
Figure 2:
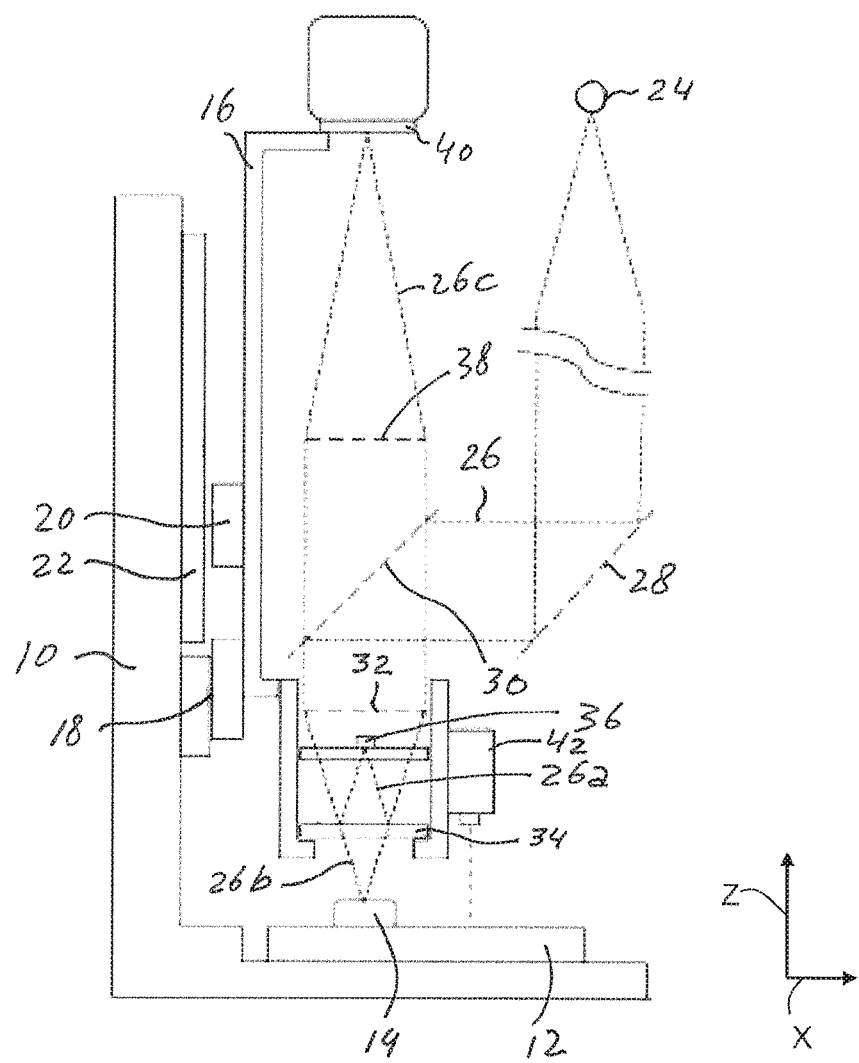
FIG. 2 schematically depicts another embodiment of a system for generating an image stack in scanning 2.5D profiling of a surface of an object in accordance with the present disclosure.

Referring to the drawings wherein like characters represent like elements, FIGS. 1 and 2 schematically depict, partly using a block diagram representation, an embodiment of a system in accordance with the present invention, including an interferometer apparatus depicted as a Mirau interferometer. Alternatively, Michelson and/or Linnik interferometer apparatus, or other optical profilers may be part of the system.

The system 100 for calculating a height map of a surface of an object from an image stack in scanning 2.5D profiling of the surface of the object includes a main frame 10 coupled to an XY stage 12 movable parallel to an X-Y plane oriented at right angles to a Z axis indicated in FIGS. 1 and 2. The XY stage 12 is configured to support an object 14 or test sample, and to move it parallel to the X-Y plane.

An optical system including an optical system frame 16 is coupled to the main frame 10 through a Z scanning motor 18 configured to move the optical system frame 16 relative to the main frame 10 in opposite directions parallel to the Z axis. A Z position of the optical system frame 16 is sensed by a linear encoder pickup sensor 20 fixed to the optical system frame 16, and sensing a linear encoder scale 22 fixed to the main frame 10.

The optical system frame 16 includes a light source 24, or broadband radiation source, being part of a broadband illuminator to provide a broadband illumination beam 26. The broadband illuminator further includes a first mirror 28, and may include further optical equipment such as lenses to provide the broadband illumination beam 26. The broadband illumination beam 26 may be parallel. The broadband illumination beam 26 is reflected on a first beam splitter 30 and passes through an objective lens 32 to reach a second beam splitter 34 for splitting the broadband illumination beam 26 in a reference beam 26a directed to a reference mirror 36, and a measurement beam 26b directed to the surface of the object 14.

The reference beam 26a may be reflected on the reference mirror 36. The measurement beam 26b may reflect from the surface of the object 14. The beam reflected from the reference mirror 36 may reflect again on the second beam splitter 34. The beam reflected from the surface of the object 14 may pass through the second beam splitter 34. The reference beam 26a and the measurement beam 26b may interfere to form an interference beam 26c and pass through the objective lens 32, the first beam splitter 30 and a lens 38 to an optical sensor 40, such as included in a camera, including an array of pixel sensors. The intensity of the interference beam 26c may be measured by the optical sensor 40.

The reference mirror 36, the objective lens 32 and the second beam splitter 34 together may form a Mirau objective and may be scanned with respect to the object 14 in the Z direction along the optical axis of the objective lens 32 by means of the optical system frame 16 moved by the Z scanning motor 18. Accordingly, the focal plane of the objective is scanned with respect to the object 14.

Figure 1A:
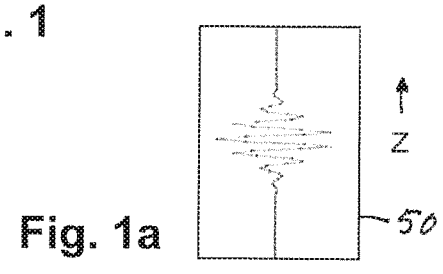
FIG. 1a depicts an interferogram, showing light intensity I against Z position when scanning a location of an object.

The signal of each of the pixel sensors of the optical sensor 40 may be read out to obtain an interferogram as depicted in box 50 in FIG. 1a, which depicts a received intensity I as a function of the Z position Z of the corresponding surface location of the object 14.

The linear encoder pickup sensor 20 interacting with the linear encoder scale 22 forms a long range type displacement sensor 20 for long range sensing of a displacement of the focal plane of the broadband illumination beam 26 for sensing low spatial frequency components. The long range type displacement sensor 20 interacting with the linear encoder scale 22 is an optical encoder, in particular a linear optical encoder. In other embodiments, a mechanical or capacitive encoder, in particular a linear mechanical or capacitive encoder is used as a long range type displacement sensor.

In the embodiment of FIGS. 1 and 2, the system 100 further includes a first short range type displacement sensor 42 for short range sensing a displacement of the focal plane for sensing high spatial frequency components. The first short range type displacement sensor 42 differs from the long range type displacement sensor 20. The first short range type displacement sensor 42 includes at least one vibration sensitive sensor, in particular an accelerometer, as shown in FIG. 1, or a Laser Doppler Vibrometer, LDV, as shown in FIG. 2, or any other suitable sensor. An LDV may include a system on a chip or a photonic integrated device.

The first short range type displacement sensor 42 is mounted to the optical system, in particular to the objective lens 32 of the optical system, and is adapted to measure short range type of displacement of the optical system with respect to the object 14, or with respect to the XY stage 12 supporting the object 14.

According to the embodiment of FIG. 1, the system 100 may further include a second short range type displacement sensor 44 for short range sensing a displacement of the focal plane for sensing high spatial frequency components. The second short range type displacement sensor 44 differs from the long range type displacement sensor 20 and from the first short range type displacement sensor 42. The second short range type displacement sensor 44 includes at least one vibration sensitive sensor, in particular an accelerometer or a Laser Doppler Vibrometer, LDV, or any other suitable sensor. An LDV may include a system on a chip or a photonic integrated device.

The second short range type displacement sensor 44 is mounted to the XY stage 12 supporting the object 14. In other embodiments, the second short range type displacement sensor 44 may be mounted to object 14. With the second short range type displacement sensor 44, the short range sensing may be based on a difference of the displacement measured by the first short range type displacement sensor 42 mounted to the optical system, and the displacement measured by the second short range type displacement sensor 44 mounted to the object, or mounted to the object stage supporting the object.

Figure 3:
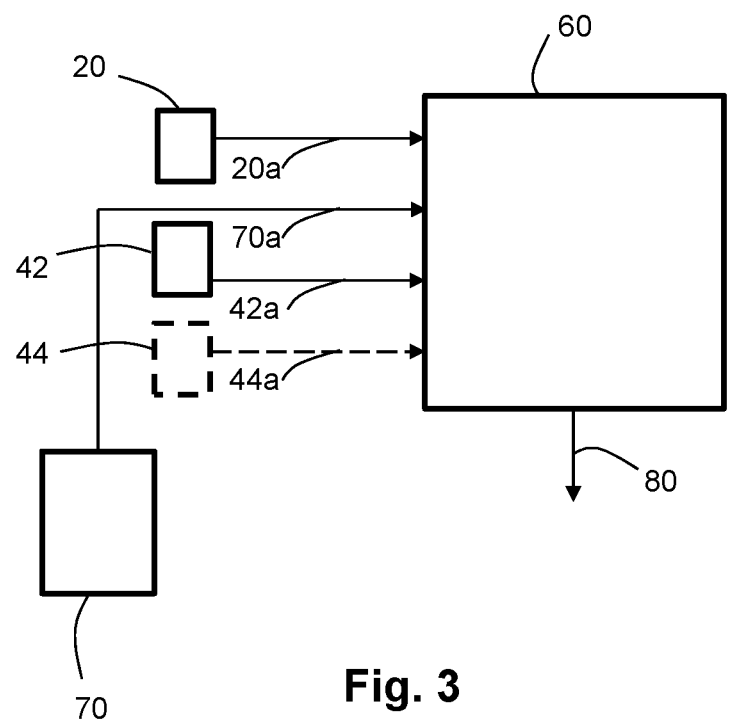
FIG. 3 depicts a block diagram of a controller of the system according to FIG. 1 or 2.

As depicted in FIG. 3, the system 100 is provided with a computer processor/processing unit 60 for receiving several input signals, including a long range sensing signal 20a from the long range type displacement sensor 20, a first short range sensing signal 42a from the first short range type displacement sensor 42 and, if the second short range type displacement sensor 44 is present, a second short range sensing signal 44a from the second short range type displacement sensor 44, and an image stack signal 70a from an optical system 70. The optional presence of the second short range type displacement sensor 44 is indicated by dashed lines.

The optical system 70 is configured for scanning a focal plane at different height positions with respect to the surface of an object 14 in scanning optical 2.5D profiling of the surface, and for capturing an image at each height position of the focal plane to form an image stack. The resulting image stack signal 70a is output from the optical system 70 to form an input signal for the processing unit 60.

The processing unit 60 is configured for, based on the input signals 20a, 42a, possibly 44a, and 70:

estimating the height position of the focal plane by combining the low spatial frequency components from the long range type displacement sensor 20 and the high spatial frequency components from the (first) short range type displacement sensor 42, and possibly from the second short range type displacement sensor 44;

calculating a height position of each image in the image stack, based on the estimated height position of each respective focal plane;

interpolating the images of the image stack to equidistant height positions for obtaining a corrected image stack; and calculating the height map of the surface of the object 14 from the corrected image stack.

The processing unit 60 may output the calculated high accuracy height map as a height map signal 80.

In the processing of the processing unit 60, the interpolating step includes providing equidistant images in height direction. The interpolating step includes interpolating the image stack intensities to an equidistant distance between all focal planes using an estimate of the height position corresponding to each focal plane. The interpolating may include performing a linear interpolation, a spline interpolation, or a cubic interpolation.

In most cases a correction of the image stack in the Z direction only with one-dimensional, 1D, short range type displacement sensors, such as accelerometers or vibration sensors, will be sufficient. However, using three-dimensional, 3D, short range type displacement sensors arranged for sensing 3D displacements, or a combination of multiple 1D short range type displacement sensors sensing in different directions, allows for additional corrections in lateral directions to compensate for lateral movement in case of strong vibrations. The lateral direction corrections applied to the image stack may be a simple translation by an integer number of pixels in either X or Y direction. Alternatively, more elaborate schemes including grid interpolation might be used. The interpolation may be either a simple linear interpolation or more elaborate interpolation schemes. A correction in the Z direction would follow. In such a case the image stack will be corrected in X, Y and Z direction. The corrected image stack is then used to derive a height map.

In case lateral corrections are desired, at least one of the first short range type displacement sensor 42 and the second short range type displacement sensor 44, or at least one further short range type displacement sensor may be configured for sensing a lateral displacement error of each image of the image stack. In such a case, the processing unit 60 may be further configured for, if a lateral displacement error of any one of the images is sensed through a short range sensing signal from any one of the short range type displacement sensors, laterally shifting or interpolating said any one of the images to correct the lateral displacement error, before obtaining the corrected image stack.

The processing of the processing unit 60 may include a filtering of a measurement from the long range sensing to remove high spatial frequency components. The processing of the processing unit 60 may further include a filtering of a measurement from the short range sensing to remove low spatial frequency components. The filtering may include using a moving average filter, a filter in the frequency domain using a Fourier transform, or any other suitable type of filtering.

As explained in detail above, according to the present invention a combination of two different types of motion/displacement sensors.

Low spatial frequencies are recorded using a long range type displacement sensor 20, for example a linear encoder. Additional filtering to remove high spatial frequency components may be applied. Suitable filters may be a moving average filter, or filters in the frequency domain using Fourier methods, or any other appropriate digital function.

High spatial frequencies are recorded using one or more short range type displacement sensors, such as accelerometers or Laser Doppler Vibrometers, LDVs. Additional filtering to remove low spatial frequency components may be applied. Suitable filters may be a moving average filter, or filters in the frequency domain using Fourier methods, or any other appropriate digital function.

In case of using accelerometers, the recorded acceleration needs to be converted to motion. This can be done by applying a double numerical integration. Appropriate methods include the bar method, trapezoid integration method, or any variation thereof.

Because of propagation of errors over time (as typically the scan speed is constant, distance is proportional to time), the displacement determined by accelerometers is only accurate within a short time span/short distance. For longer range accuracy additional data using a different sensor would be needed.

As explained in detail above, in a method and system for calculating a height map of a surface of an object from an image stack in scanning optical 2.5D profiling of the surface by an optical system, a focal plane is scanned at different height positions with respect to the object surface. An image is captured at each height position to form the image stack. A height map of the object surface is calculated from the image stack. The scanning of the focal plane includes long range sensing and short range sensing a displacement of the focal plane for sensing low and high spatial frequency components. The low and high spatial frequency components are combined for estimating a distance between the surface of the object and the focal plane of the optical system. A height displacement error of each image in the image stack is calculated, based on the estimated distance of each respective focal plane. At least one of the images of the image stack is corrected in height direction, based on the associated height displacement error. The height map of the surface of the object is calculated from the corrected image stack.

Herein, vertical scanning and a Cartesian coordinate system is assumed. However, the method and system as discloses herein is also applicable for other configurations. For example, in engine borehole measurements, scanning is done axially with respect to the engine borehole. As such, a cylindrical coordinate system is typically used. Other configurations, such as a rotated configuration, may be applicable as well.

As required, detailed embodiments of the present invention are disclosed herein; however, it is to be understood that the disclosed embodiments are merely exemplary of the invention, which can be embodied in various forms. Therefore, specific structural and functional details of embodiments disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a"/"an", as used herein, are defined as one or more than one. The term plurality, as used herein, is defined as two or more than two. The term another, as used herein, is defined as at least a second or more. The terms including and/or having, as used herein, are defined as including (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfil the functions of several items recited in the claims.

The terms software, program, software application, and the like as used herein, are defined as a sequence of instructions designed for execution on a computer system. Software, a program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

A computer program may be stored and/or distributed on a suitable medium, such as an optical storage medium or a solid-state medium supplied together with or as part of other hardware, but also be distributed in other forms, such as via the Internet or other wired or wireless telecommunication systems.

It is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Furthermore, the terms and phrases used herein are not intended to be limiting, but rather, to provide an understandable description of the invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A method for calculating a height map of a surface of an object from an image stack in scanning optical 2.5D profiling of the surface by an optical system, the method comprising:
    moving to different height positions along a vertical axis, by actuating a scanning motor, an optical system frame with respect to a main frame along the vertical axis;
    scanning a focal plane at the different height positions with respect to the surface of the object;
    at each height position of the focal plane:
        emitting a light towards the surface of the object,
        splitting the emitted light into a reference beam and a measurement beam, the reference beam being directed towards a reference mirror, and the measurement beam being directed towards the surface of the object,
        wherein the reference mirror reflects the reference beam to meet with a reflected measurement beam, which reflects from the surface of the object, to form an interference beam,
        measuring an intensity of the interference beam using an optical sensor, and
        capturing, using the optical sensor, an image to form the image stack, the image stack being formed using images captured at the each height position of the focal plane, wherein the scanning of the focal plane comprises:
    long range sensing a displacement of the focal plane for sensing low spatial frequency components;
    short range sensing a displacement of the focal plane for sensing high spatial frequency components; and
    estimating the height position of the focal plane by combining the low spatial frequency components and the high spatial frequency components and based on the intensity of the interference beam,
    calculating a height position of each image in the image stack, based on the estimated height position of each respective focal plane;
    interpolating the images of the image stack to equidistant height positions for obtaining a corrected image stack; and
    calculating the height map of the surface of the object from the corrected image stack.

2. The method according to claim 1, wherein the interpolating comprises performing one of a linear interpolation, a spline interpolation, or a cubic interpolation.

3. The method according to claim 1, wherein the long range sensing comprises one of optical linear encoding, mechanical linear encoding, or capacitive linear encoding.

4. The method according to claim 1, wherein the short range sensing comprises sensing vibrations.

5. The method according to claim 1, wherein the short range sensing is performed from an objective of the optical system.

6. The method according to claim 5, wherein the short range sensing comprises sensing a displacement of the optical system with respect to the object or with respect to an object stage supporting the object.

7. The method according to claim 5, wherein:
    the short range sensing is performed from the object, or from an object stage supporting the object, and
    the short range sensing is based on a difference of a displacement sensed by the short range sensing performed from the optical system and a displacement sensed by the short range sensing from the object or from the object stage supporting the object.

8. The method according to claim 1, further comprising filtering a measurement from at least one of:
    the long range sensing to remove high spatial frequency components; and
    the short range sensing to remove low spatial frequency components.

9. The method according to claim 8, wherein the filtering comprises using a moving average filter, or a filler in the frequency domain using a Fourier transform.

10. The method according to claim 1, further comprising, before obtaining the corrected image slack:
    sensing a lateral displacement error of each image of the image stack; and
    upon sensing a lateral displacement error of any one of the images, laterally shifting or interpolating said any one of the images to correct the lateral displacement error.

11. A system for calculating a height map of a surface of an object from an image stack in scanning optical 2.5D profiling of the surface, the system comprising:
    a scanning motor that moves, to different height positions along a vertical axis, an optical system frame with respect to a main frame along the vertical axis;
    an optical system that
        senses scanning a focal plane at the different height positions with respect to the surface of the object,
        at each height position of the focal plane:
            emits a light towards the surface of the object;
            splits the emitted light into a reference beam and a measurement beam, the reference beam being directed towards a reference mirror, and the measurement beam being directed towards the surface of the object,
            wherein the reference mirror reflects the reference beam to meet with a reflected measurement beam, which reflects from the surface of the object, to form an interference beam,
            measures an intensity of the interference beam using an optical sensor, and captures, using the optical sensor, an image to form the image stack, the image stack being formed using images captured at the each height position of the focal plane;

a long range type displacement sensor that long range senses a displacement of the focal plane by sensing low spatial frequency components;

a short range type displacement sensor that short range senses a displacement of the focal plane by sensing high spatial frequency components, the short range type displacement sensor differing from the long range type displacement sensor; and a processor; and a memory including instructions that, when executed by the processor, cause the processor to perform operations including:

estimating the height position of the focal plane by combining the low spatial frequency components from the long range type displacement sensor and the high spatial frequency components from the short range type displacement sensor, and based on the intensity of the interference beam;

calculating a height position of each image in the image stack, based on the estimated height position of each respective focal plane;

interpolating the images of the image stack to equidistant height positions for obtaining a corrected image stack; and calculating the height map of the surface of the object from the corrected image stack.

12. The system according to claim 11, wherein the long range type displacement sensor comprises one of an optical linear encoder, a mechanical linear encoder, or a capacitive linear encoder.

13. The system according to claim 11, wherein the short range type displacement sensor comprises at least one vibration sensitive sensor comprising one of:

an accelerometer; or a Laser Doppler Vibrometer comprising one of a system on a chip or a photonic integrated device.

14. The system according to claim 11, wherein at least one short range type displacement sensor is mounted to an objective of the optical system.

15. The system according to claim 14, wherein the short range type displacement sensor is configured to measure a short range type of a displacement of the optical system with respect to the object or with respect to an object stage supporting the object.

16. The system according to claim 14, further comprising at least one additional short range type displacement sensor mounted to the object or mounted to an object stage supporting the object, wherein:

the memory further causes the processor to perform short range sensing based on a difference of the displacement measured by the short range type displacement sensor mounted to the objective of the optical system, and the displacement measured by the at least one additional short range type displacement sensor.

17. The system according to claim 11, further comprising at least one additional short range type displacement sensor that senses a lateral displacement error of each image of the image stack, wherein:

the memory further causes the processor to perform, upon the sensing of a lateral displacement error of any one of the images, laterally shifting or interpolating said any one of the images to correct for the lateral displacement error, before obtaining the corrected image stack.

18. The method according to claim 1, wherein the interference beam is formed at another beam splitter.

19. The method according to claim 1, wherein lenses of a measurement device are fixedly positioned with respect to the optical system frame.

\* \* \* \* \*